(12) United States Patent
Lin

(10) Patent No.: US 8,771,091 B1
(45) Date of Patent: Jul. 8, 2014

(54) TWO-TORQUE-PRODUCING CONNECTING ROD ASSEMBLY

(71) Applicant: Ying-Mo Lin, Nantou County (TW)

(72) Inventor: Ying-Mo Lin, Nantou County (TW)

(*) Notice: Subject to any disclaimer, the term of this patent is extended or adjusted under 35 U.S.C. 154(b) by 0 days.

(21) Appl. No.: 13/792,062

(22) Filed: Mar. 9, 2013

(30) Foreign Application Priority Data

Jan. 18, 2013 (TW) .............................. 102201127 U

(51) Int. Cl.
*F16D 27/01* (2006.01)

(52) U.S. Cl.
USPC .......... 464/97; 403/383; 403/DIG. 1; 81/438; 464/901

(58) Field of Classification Search
CPC .............. F16D 27/01; F16D 2001/102; Y10S 464/901; B25B 23/1427
USPC ......... 464/29, 97, 160, 901; 403/383, DIG. 1; 81/467, 473, 475, 438
See application file for complete search history.

(56) References Cited

U.S. PATENT DOCUMENTS

| | | | |
|---|---|---|---|
| 2,822,677 A * | 2/1958 | Reynolds | 464/97 |
| 3,131,554 A * | 5/1964 | Hornschuch et al. | 464/97 X |
| RE36,797 E * | 8/2000 | Eggert et al. | |
| 6,840,143 B1 * | 1/2005 | Lin | |

* cited by examiner

*Primary Examiner* — Gregory Binda
(74) *Attorney, Agent, or Firm* — Banger Shia

(57) ABSTRACT

A two-torque-producing connecting rod assembly used in combination with a hand tool is provided with a rod and a connecting member. The rod is polygonal and includes a big first section, a small second section and a connecting portion. The connecting member is a hollow cylindrical structure sleeved on the rod and has an inserting cavity and a stepped receiving cavity. The receiving cavity includes an outer section, an inner section and a middle section which is smaller in diameter than the outer section but larger than the inner section, the outer section includes plural alternatively-arranged arc-shaped concave portions and pointed convex portions. When the first section of the rod is inserted in the outer section of the connecting member, plural angles of the first section are disposed between the arc-shaped concave portions and restricted to move between the two ends by the pointed convex portions.

6 Claims, 7 Drawing Sheets

TWO-TORQUE-PRODUCING CONNECTING ROD ASSEMBLY

BACKGROUND OF THE INVENTION

1. Field of the Invention

The present invention relates to a connecting rod assembly, and more particularly to a two-torque-producing connecting rod assembly used in combination with a hand tool.

2. Description of the Prior Art

Please refer to FIG. 1 and the curve L1 of FIG. 6, which show a conventional connecting rod 10 which is provided with a rod 11 of the same diameter. It is to be noted that, during rotation operation, when the torsion angle of the connecting rod 10 is increased a little, the resultant torque applied on the object to be rotated will be increased significantly, and the torque is likely to exceed the structural strength of the small-diameter bolt or the object to be rotated, therefore, the user would have difficulty controlling the torque, causing damage to the bolt to be rotated.

The present invention has arisen to mitigate and/or obviate the afore-described disadvantages.

SUMMARY OF THE INVENTION

The primary objective of the present invention is to provide a two-torque-producing connecting rod assembly used in combination with a hand tool. During the rotation operation, the user can feel the small torque due to the large torsion angle, so that the user will know it and stop rotating the connecting rod when the torque applied is big enough. Therefore, the user can directly and easily determine how much torque should be applied, effectively preventing the problem that the small-diameter bolt is likely to be damaged by an excessive torque, and making it easier for the user to control the torque.

To achieve the above objective, a two-torque-producing connecting rod assembly in accordance with the present invention comprises: a rod and a connecting member. The rod is polygonal in cross section and includes a first section and a second section which is smaller in diameter than the first section, the first section being provided at one end thereof with a connecting portion. The connecting member is a hollow cylindrical structure sleeved on the rod and having an inserting cavity at one end thereof and a stepped receiving cavity at another end thereof. The receiving cavity includes an outer section, an inner section and a middle section connected between the outer and inner section. The middle section has a diameter smaller than a diameter of the outer section but larger than a diameter of the inner section, an inner surface of the outer section being formed by plural alternatively-arranged arc-shaped concave portions and alternatively-arranged pointed convex portions, the rod has the first section fitted in the outer section and has the second section inserted in the middle section, and an end of the second section is inserted in the inner section of the connecting member. Each of the pointed convex portions is formed by two planar surfaces, each of the arc-shaped concave portions having two ends connected to neighboring pointed convex portions, and a middle point between the two ends. One of the two ends of each of the arc-shaped concave portions, a center of the outer section, and the middle point of each of the arc-shaped concave portions define an angle ranging from 8-30 degrees, when the first section of the rod is inserted in the outer section of the connecting member, plural angles of the first section are disposed between the two ends of the arc-shaped concave portions and restricted to move between the two ends by the pointed convex portions.

DETAILED DESCRIPTION OF THE PREFERRED EMBODIMENTS

Figure 1:
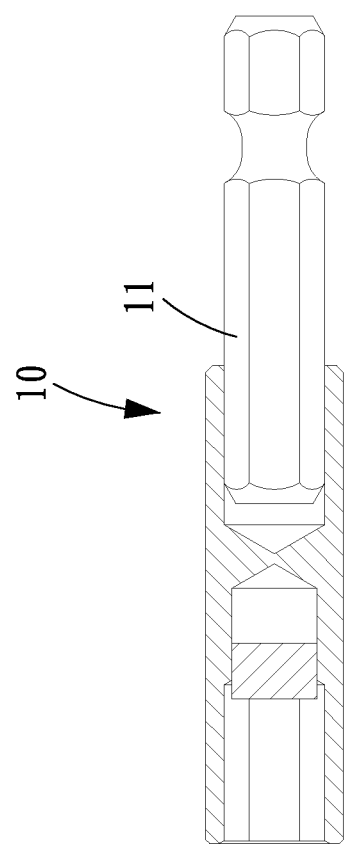
FIG. 1 is a cross sectional view of a conventional connecting rod.

The present invention will be clearer from the following description when viewed together with the accompanying drawings, which show, for purpose of illustrations only, the preferred embodiment in accordance with the present invention.

Referring to FIGS. 2-5A, a two-torque-producing connecting rod assembly and a tool head in accordance with a preferred embodiment of the present invention are shown, wherein the connecting rod assembly comprises: a rod 20, a connecting member 30, a gripping member 40 and a magnetic member 50, and the tool head 60 is inserted into one end of the connecting rod assembly.

Figure 2:
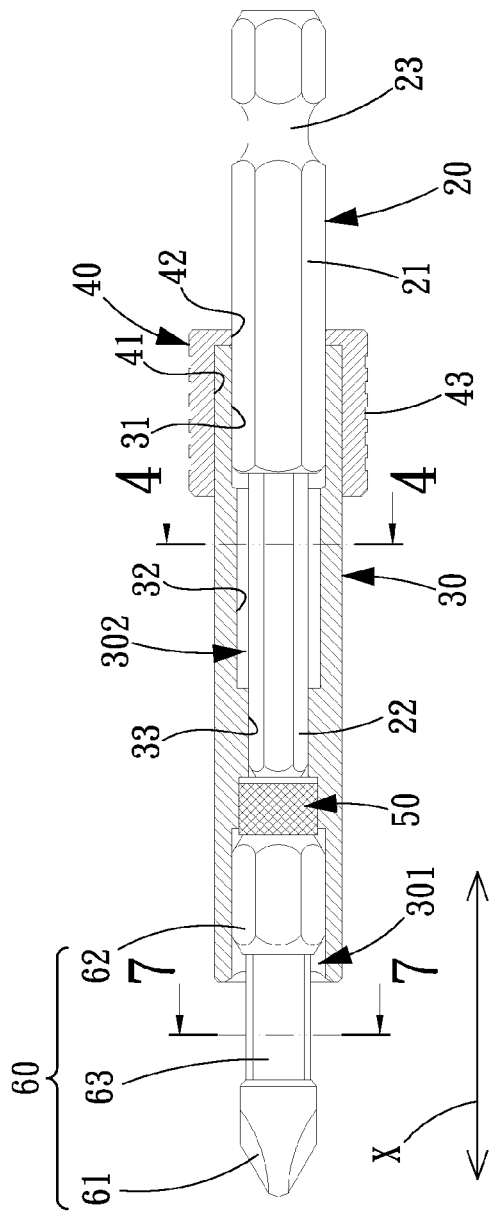
FIG. 2 is a cross sectional view of a connecting rod assembly in accordance with the present invention.
Figure 5A:
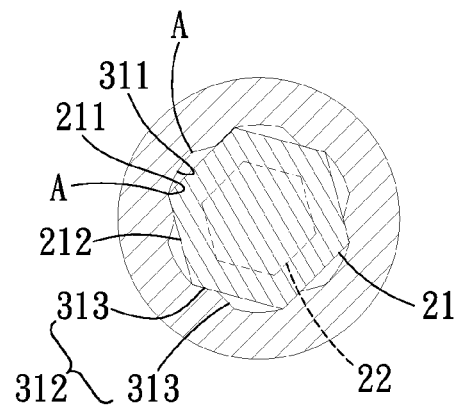
FIG. 5A is a first illustrative view taken along the line 5A-5A of FIG. 3, showing the torsion of the connecting rod assembly in accordance with the present invention, wherein the gripping member is not shown.

As shown in FIGS. 2 and 5A, the rod 20 is hexagonal in cross section and includes a first section 21 and a second section 22 which is smaller in diameter than the first section 21. The first section 21 is provided at one end thereof with a connecting portion 23 which is in the form of an annular groove to be clamped by a hand tool, such as a screwdriver.

As shown in FIG. 2, the connecting member 30 is a hollow cylindrical structure sleeved on the rod 20 and has an inserting cavity 301 at one end thereof and a receiving cavity 302 at another end thereof. The inserting cavity 301 is further provided at the bottom thereof with a groove for holding the magnetic member 50 to attract the tool head 60 inserted in the inserting cavity 301. The receiving cavity 302 is a stepped structure consisting of an outer section 31 with a polygonal cross section, an inner section 33 with a hexagonal cross section and a middle section 32 connected between the outer and inner section 31, 33. The middle section 32 has a diameter smaller than a diameter of the outer section 31 but larger than a diameter of the inner section 33. The inner surface of the outer section 31 is formed by six alternatively-arranged arc-shaped concave portions 311 and six alternatively-arranged pointed convex portions 312. The rod 20 has the first section 21 loosely fitted in the outer section 31 and has the second section 22 inserted in the middle section 32, and the end of the second section 22 is inserted in the inner section 33 of the connecting member 30 to form an interference fit.

Figure 4:
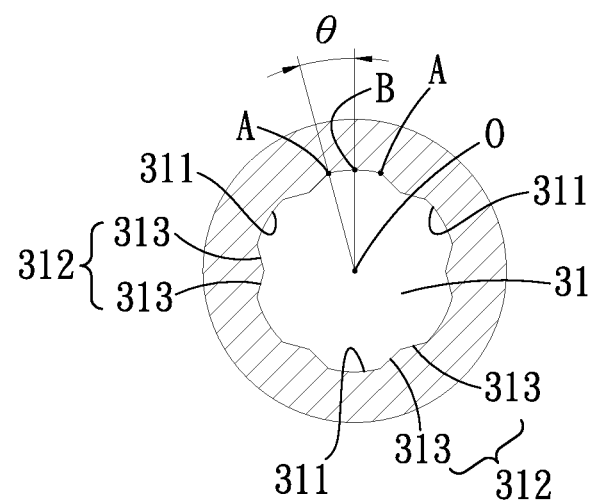
FIG. 4 is a cross sectional view taken along the line 4-4 of FIG. 2, showing the connecting member of the connecting rod assembly in accordance with the present invention, wherein the rod is not shown.

As shown in FIG. 4, the arc-shaped concave portions 311 of the outer section 31 of the connecting member 30 can be connected to form a circular shape and have the same radius of curvature. Each of the pointed convex portions 312 is formed by two planar surfaces 313. Each of the arc-shaped concave portions 311 has two ends A connected to neighboring pointed convex portions 312, and further has a middle point B between the two ends A. One of the ends A, a center O of the outer section 31, and the middle point B of each of the arc-shaped concave portions 311 define an angle θ ranging from 8-30 degrees (8°≤θ≤30°). In the embodiment as shown in FIG. 4, the angle θ is 15 degrees, the first section 21 of the rod 20 is inserted in a through hole 42 of the gripping member 40, and each of six angles 211 of the first section 21 is disposed between two ends A of the arc-shaped concave portions 311. When the rod 20 rotates an angle less than the angle θ, each of six angles 211 of the first section 21 is disposed between two ends A of the arc-shaped concave portions 311 and will be restricted to rotate between the two ends A by the six pointed convex portions 312.

As shown in FIGS. 2, 4 and 5A, the gripping member 40 is formed with a cylindrical cavity 41, and the end of the connecting member 30 formed with the receiving cavity 302 is received in the cylindrical cavity 41. At the bottom of the cylindrical cavity 41 is formed the through hole 42 for insertion of the first section 21 of the rod 20. The gripping member 40 is used to strengthen the structural strength of the connecting member 30. In this embodiment, the gripping member 40 is formed on the outer surface thereof with an antiskid rib 43 for easy gripping of the gripping member 40.

Figure 3:
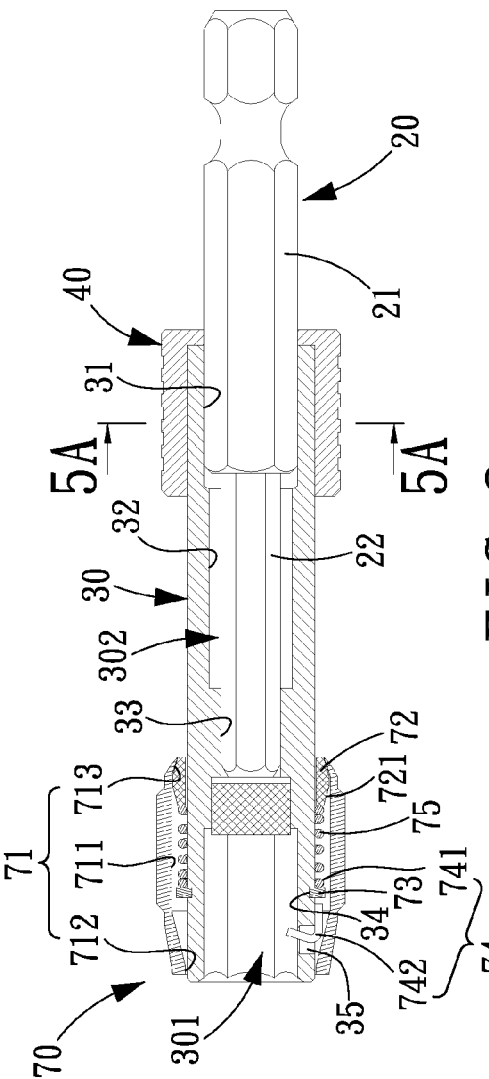
FIG. 3 is another cross sectional view of the connecting rod assembly in accordance with the present invention.

As shown in FIGS. 2 and 3, the end of the connecting member 30 formed with the inserting cavity 301 is further provided with an annular groove 34, an aperture 35 and a quick-release device 70. A hook 74 of the quick-release device 70 is driven by a sleeve 71 to move in and out of the inserting cavity 301 via the aperture 35, which allows for quick release or assembly of the tool head 60.

The quick-release device 70 comprises: the sleeve 71, a restricting ring 72, a C-ring 73, the hook 74, and a helical spring 75. The sleeve 71 is formed with an inner space 711, a front end 712 and a rear end 713 with a diameter larger than the front end 712. The front end 712 of the sleeve 71 is sleeved on the end of the connecting member 30 formed with the inserting cavity 301. The restricting ring 72 is formed with an annular rib 721 which has an arc-shaped cross section, and the restricting ring 72 is sleeved between the connecting member 30 and the rear end 713 of the sleeve 71, and the annular rib 721 has an outer diameter larger than the inner diameter of the rear end 713 of the sleeve 71.

The C-ring 73 is disposed in the annular groove 34 of the connecting member 30, and the outer surface of the C-ring 73 partially protrudes out of the annular groove 34. The hook 74 has an annular portion 741 sleeved on the connecting member 30 and abutted against the C-ring 73. The annular portion 741 is formed with a hook portion 742 inserted in the aperture 35 of the connecting member 30. The helical spring 75 is sleeved on the connecting member 30 with two ends pressed against the annular portion 741 of the hook 74 and the restricting ring 72 in such a manner that the annular rib 721 of the restricting ring 72 is pushed against the inner surface of the rear end 713 of the sleeve 71 by the helical spring 75, and the hook portion 742 of the hook 74 is pushed by the inner surface of the front end 712 of the sleeve 71 to move in and out of the inserting cavity 301 of the connecting member 30 via the aperture 35.

The above is the structure of the present invention, as for the operation and function of the preferred embodiment of the present invention, reference should be made to FIGS. 1-2, 6-7 and the description below.

Figure 5B:
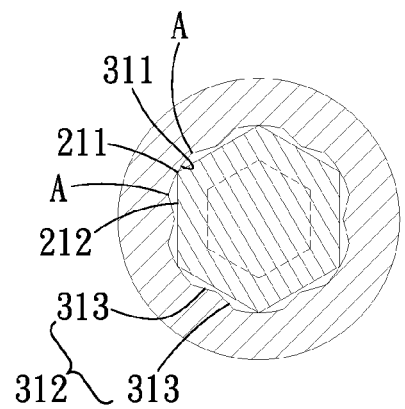
FIG. 5B is a second illustrative view taken along the line 5A-5A of FIG. 3, showing the torsion of the connecting rod assembly in accordance with the present invention, wherein the gripping member is not shown.
Figure 5C:
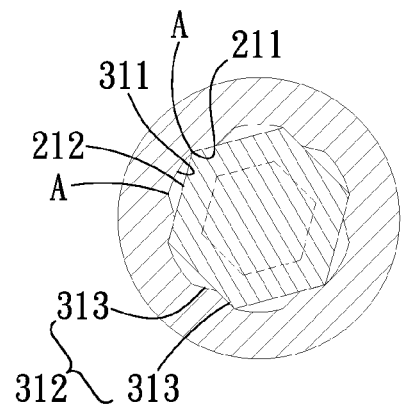
FIG. 5C is a third illustrative view taken along the line 5A-5A of FIG. 3, showing the torsion of the connecting rod assembly in accordance with the present invention, wherein the gripping member is not shown.

As shown in FIGS. 2, 5A-5C and 6, with the design of the different diameters of the rod 20 and the angle θ of the outer section 31 of the connecting member 30, as illustrated in FIG. 5B, when the rod 20 rotates an angle less than the angle θ (clockwise or counterclockwise rotation), only the second section 22 of the rod 20 will rotate. When the rod 20 rotates an angle larger than the angle θ, as shown in FIGS. 5A, 5C, the six angles 211 of the first section 21 of the rod 20 are pressed against the two ends A, and the six surfaces 212 of the rod 20 are abutted against the planar surfaces 313 of the pointed convex portions 312, so that the rod 20 will elastically rotate, and the first section 21 will rotate. During the rotating operation, the gripping member 40 provides for gripping by the user, so that the user can feel whether the gripping member 40 rotates along with the rod 20 by gripping the gripping member 40. Therefore, the user can directly and easily determine how much torque should be applied, effectively preventing the problem that the small-diameter bolt is likely to be damaged by an excessive torque, and making it easier for the user to control the torque.

Figure 6:
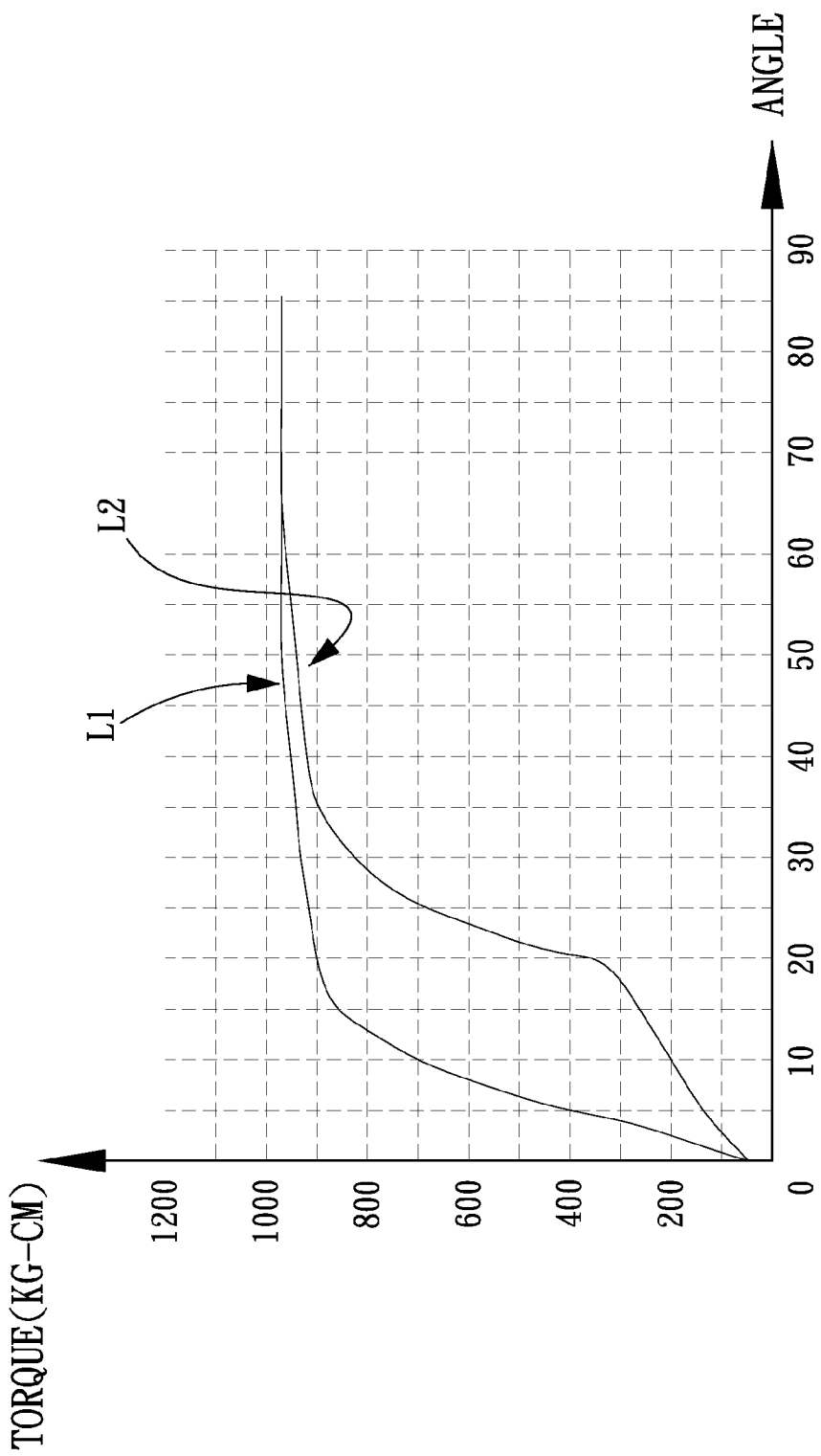
FIG. 6 is a torque diagram, the curve L1 illustrates the relationship between the torque and the rotation angle of the conventional connecting rod assembly, and the curve L2 illustrates the relationship between the torque and the rotation angle of the connecting rod assembly of the present invention.

As shown in FIG. 6, the curve L1 illustrates the relationship between the torque and the rotation angle of the conventional connecting rod assembly, and the curve L2 illustrates the relationship between the torque and the rotation angle of the connecting rod assembly of the present invention. The curve L1 shows that the torque rises sharply to the torque limit (about 900 KG-CM) of the connecting rod. The rotation angle will be very difficult to control when it comes to a small-diameter bolt, and the connecting rod is very likely to excessively rotate to produce an excessive torque load, causing damage to the small-diameter bolt. However, as illustrated by the curve L2, with the design of the different diameters of the rod 20 and the angle θ of the outer section 31 of the connecting member 30, the small diameter section of the rod 20 will make the torque rise smoothly when the rotation angle is less than 20 degrees. When the rotation angle of the rod 20 is larger than 20 degrees, the large diameter section of the rod 20 will take the place of the small diameter section and starts rotating, so as to produce a relatively large torque transmission, and considerably broadening the scope of the rotation angle. This design prevents the problem that the rotation angle becomes excessively large during rotating operation and cause damage to the object to be rotated. Especially, it provides protection when the bolt is rotated to fix an object made of plastic or wood.

Figure 7:
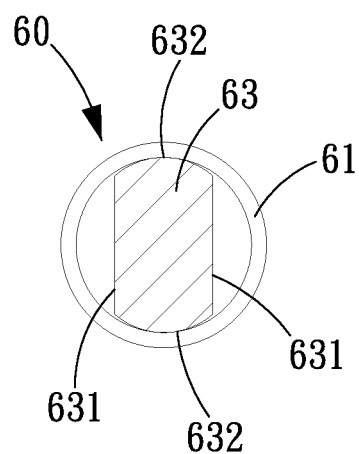
FIG. 7 is a first cross sectional view taken along the line 7-7 of FIG. 2, showing the neck portion of a tool head which is used in combination with the connecting rod assembly in accordance with the present invention.
Figure 8A:
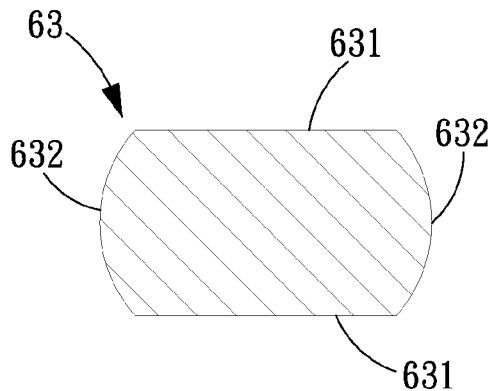
FIG. 8A is a first cross sectional view taken in a direction perpendicular to the axis of the tool head, showing the neck portion of a tool head which is used in combination with the connecting rod assembly in accordance with the present invention.

As shown in FIGS. 2, 7 and 8A, the two-torque-producing connecting rod assembly in accordance with the present invention can be used in combination with another two-torque-producing tool head 60 which is provided with a head portion 61, a drive portion 62 and a neck portion 63. A direction in which the head portion 61, the drive portion 62 and the neck portion 63 of the tool head 60 extend is defined as X direction, and a cross section of the neck portion 63 is perpendicular to the X direction and approximately a rectangular structure formed by two opposite straight lines 631 and two opposite arc-shaped lines 632.

Figure 8D:
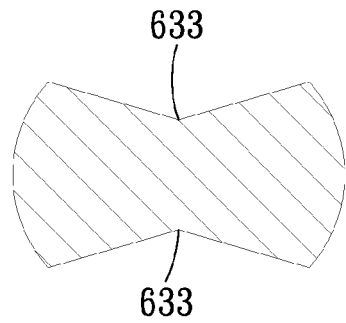
FIG. 8D is a fourth cross sectional view taken in a direction perpendicular to the axis of the tool head, showing the neck portion of a tool head which is used in combination with the connecting rod assembly in accordance with the present invention.
Figure 8B:
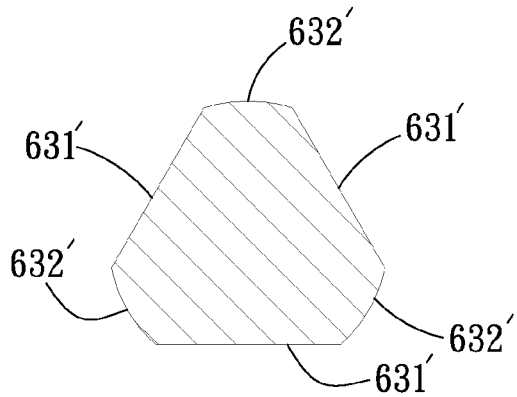
FIG. 8B is a second cross sectional view taken in a direction perpendicular to the axis of the tool head, showing the neck portion of a tool head which is used in combination with the connecting rod assembly in accordance with the present invention.
Figure 8E:
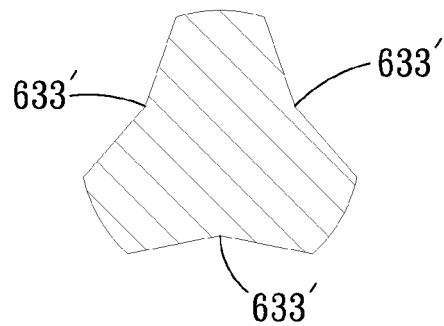
FIG. 8E is a fifth cross sectional view taken in a direction perpendicular to the axis of the tool head, showing the neck portion of a tool head which is used in combination with the connecting rod assembly in accordance with the present invention.
Figure 8C:
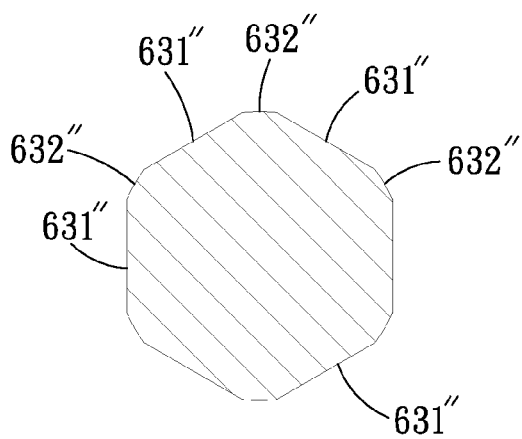
FIG. 8C is a third cross sectional view taken in a direction perpendicular to the axis of the tool head, showing the neck portion of a tool head which is used in combination with the connecting rod assembly in accordance with the present invention.
Figure 8F:
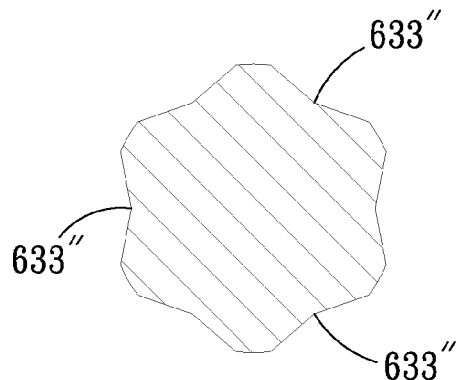
FIG. 8F is a sixth cross sectional view showing the neck portion of a tool head which is used in combination with the connecting rod assembly in accordance with the present invention.

The cross section of the neck portion 63 of the tool head 60 is not limited to the abovementioned rectangular structure, it can also be a triangle structure formed by three straight lines 631' and three arc-shaped lines 632', as shown in FIG. 8B; or can be a hexagonal structure, as shown in FIG. 8C, formed by six straight lines 631" and six arc-shaped lines 632"; or can also have the shapes as shown in FIGS. 8D-8F, wherein the straight lines 631, 631' and 631" as shown in FIGS. 8A-8C have been replaced with pointed concaves 633, 633' and 633".

The cross section of the neck portion of the tool head is non-circular-shaped, the polygonal cross section is relatively small and has a relatively great elastic deformation capacity as compared to the circular cross section. As indicted by the curve L2 in FIG. 6, the user can feel the small torque due to the large torsion angle, enabling the user to feel the torsion angle of the connecting rod assembly and to control the torque more easily, effectively preventing the problem that the small-diameter bolt is likely to be damaged by an excessive torque.

While we have shown and described various embodiments in accordance with the present invention, it is clear to those skilled in the art that further embodiments may be made without departing from the scope of the present invention.

What is claimed is:

1. A two-torque-producing connecting rod assembly comprising:
    a rod being polygonal in cross section and including a first section and a second section which is smaller in diameter than the first section, the first section being provided at one end thereof with a connecting portion;
    a connecting member being a hollow cylindrical structure sleeved on the rod and having an inserting cavity at one end thereof and a stepped receiving cavity at another end thereof;
    the receiving cavity including an outer section, an inner section and a middle section connected between the outer and inner section, the middle section having a diameter smaller than a diameter of the outer section but larger than a diameter of the inner section, an inner surface of the outer section being formed by plural alternatively-arranged arc-shaped concave portions and alternatively-arranged pointed convex portions;
    the rod has the first section fitted in the outer section and has the second section inserted in the middle section, and an end of the second section is inserted in the inner section of the connecting member;
    each of the pointed convex portions being formed by two planar surfaces;
    each of the arc-shaped concave portions having two ends connected to neighboring pointed convex portions, and a middle point between the two ends, one of the two ends of each of the arc-shaped concave portions, a center of the outer section, and the middle point of each of the arc-shaped concave portions define an angle ranging from 8-30 degrees, when the first section of the rod is inserted in the outer section of the connecting member, plural angles of the first section are disposed between the two ends of the arc-shaped concave portions and restricted to move between the two ends by the pointed convex portions;
    a gripping member is formed with a cylindrical cavity, and the another end of the connecting member formed with the receiving cavity is received in the cylindrical cavity, at a bottom of the cylindrical cavity is formed a through hole for insertion of the first section of the rod.

2. The two-torque-producing connecting rod assembly as claimed in claim 1, wherein the arc-shaped concave portions of the outer section of the connecting member have the same radius of curvature, and each of the pointed convex portions is formed by two planar surfaces.

3. The two-torque-producing connecting rod assembly as claimed in claim 1, wherein the rod is hexagonal in cross section, and the inner surface of the inner section is formed by six alternatively-arranged arc-shaped concave portions and six alternatively-arranged pointed convex portions.

4. The two-torque-producing connecting rod assembly as claimed in claim 1, wherein the gripping member is formed on an outer surface thereof with an antiskid rib for gripping of the gripping member.

5. The two-torque-producing connecting rod assembly as claimed in claim 1, wherein a magnetic member is disposed at a bottom of the inserting cavity.

6. The two-torque-producing connecting rod assembly as claimed in claim 1, wherein a quick-release device is disposed at the one end of the connecting member formed with the inserting cavity, and the one end of the connecting member formed with the inserting cavity is further provided with an aperture, the quick-release device has a hook which is driven by a sleeve to move in and out of the inserting cavity via the aperture.

* * * * *